(12) United States Patent
Geekie et al.

(10) Patent No.: US 12,176,970 B2
(45) Date of Patent: Dec. 24, 2024

(54) ANTENNA ELEMENT FEED PATH COMPONENT MANAGEMENT FOR 5G-NR MILLIMETER WAVE

(71) Applicant: QUALCOMM Incorporated, San Diego, CA (US)

(72) Inventors: James Francis Geekie, Carlsbad, CA (US); Raghu Narayan Challa, San Diego, CA (US); Ruhua He, San Diego, CA (US); Mihir Vijay Laghate, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 16/390,913

(22) Filed: Apr. 22, 2019

(65) Prior Publication Data
US 2019/0379427 A1     Dec. 12, 2019

Related U.S. Application Data

(60) Provisional application No. 62/684,101, filed on Jun. 12, 2018.

(51) Int. Cl.
| | |
|---|---|
| *H04B 7/022* | (2017.01) |
| *H01Q 3/34* | (2006.01) |
| *H01Q 9/04* | (2006.01) |
| *H01Q 21/06* | (2006.01) |

(Continued)

(52) U.S. Cl.
CPC ............ *H04B 7/022* (2013.01); *H01Q 3/34* (2013.01); *H01Q 9/0407* (2013.01);
(Continued)

(58) Field of Classification Search
CPC ...... H04B 7/022; H04B 7/0682; H04B 17/00; H04B 7/06; H04B 7/08; H04B 7/0413;
(Continued)

(56) References Cited

U.S. PATENT DOCUMENTS

| | | | |
|---|---|---|---|
| 7,200,368 B1 | 4/2007 | Hottinen et al. | |
| 7,545,874 B1 * | 6/2009 | Tang | ................... H04L 27/2647 |
| | | | 370/203 |

(Continued)

FOREIGN PATENT DOCUMENTS

| | | |
|---|---|---|
| CN | 101331503 A | 12/2008 |
| WO | WO-2015006293 | 1/2015 |
| WO | WO-2019126264 A1 | 6/2019 |

OTHER PUBLICATIONS

International Search Report and Written Opinion—PCT/US2019/028758—ISA/EPO—Jul. 22, 2019 (183559WO).

*Primary Examiner* — Olumide Ajibade Akonai
*Assistant Examiner* — Yonghong Li
(74) *Attorney, Agent, or Firm* — QUALCOMM Incorporated

(57) ABSTRACT

Systems and methods providing antenna element feed path component management for facilitating millimeter wave communication are described. Embodiments can enable and provide mitigation of thermal, power consumption, and/or maximum permissible exposure issues with respect to millimeter wave communication, such as by $5^{th}$ generation (5G) or new radio (NR) compliant user equipment. Accordingly, embodiments are configured to manage transceiver antenna element feed path components to mitigate thermal, power consumption, and/or MPE concerns. For example, a communication device configured in accordance with concepts herein may reduce or otherwise control temperatures of various components, device power consumption, and/or user exposure to millimeter wave energy, such as to improve user experience, avoid component failure, extend battery life, etc.

28 Claims, 6 Drawing Sheets

(51) Int. Cl.
    *H01Q 21/24*     (2006.01)
    *H01Q 25/04*     (2006.01)
    *H04B 7/06*      (2006.01)
    *H04W 16/26*     (2009.01)

(52) U.S. Cl.
    CPC .......... *H01Q 21/065* (2013.01); *H01Q 21/24* (2013.01); *H01Q 25/04* (2013.01); *H04B 7/0682* (2013.01); *H04W 16/26* (2013.01)

(58) Field of Classification Search
    CPC .......... H04B 7/04; H01Q 3/34; H01Q 9/0407; H01Q 21/065; H01Q 21/24; H01Q 25/04; H04W 16/26; H04W 52/0274; H04W 52/04; Y02D 30/70
    See application file for complete search history.

(56)        References Cited

U.S. PATENT DOCUMENTS

| | | | |
|---|---|---|---|
| 9,019,880 B2 * | 4/2015 | Ehsan | H04W 52/325 |
| | | | 455/450 |
| 9,515,378 B2 * | 12/2016 | Prasad | H01Q 3/26 |
| 9,936,456 B1 | 4/2018 | Carroll et al. | |
| 2012/0311357 A1 * | 12/2012 | Andrews | G06F 1/324 |
| | | | 713/320 |
| 2013/0041513 A1 * | 2/2013 | Cox | G06F 1/203 |
| | | | 700/286 |
| 2014/0199952 A1 | 7/2014 | Sandhu et al. | |
| 2014/0320344 A1 | 10/2014 | Sanderovich et al. | |
| 2017/0356980 A1 * | 12/2017 | Islam | G01S 5/02 |
| 2021/0091833 A1 * | 3/2021 | Arunachalam | H04B 7/0617 |

* cited by examiner

ANTENNA ELEMENT FEED PATH COMPONENT MANAGEMENT FOR 5G-NR MILLIMETER WAVE

CROSS-REFERENCE TO RELATED APPLICATIONS

This application claims priority to U.S. Provisional Patent Application 62/684,101, entitled, "ANTENNA ELEMENT FEED PATH COMPONENT MANAGEMENT FOR 5G-NR MILLIMETER WAVE COMMUNICATION," filed on Jun. 12, 2018, the disclosure of which is hereby incorporated by reference in its entirety as if fully set forth below and for all application purposes.

TECHNICAL FIELD

Aspects of the present disclosure relate generally to wireless communication systems, and more particularly, to antenna element feed path component management for facilitating millimeter wave communication. Certain embodiments of the technology discussed below can enable and provide mitigation of thermal, power consumption, and/or maximum permissible exposure issues with respect to millimeter wave communication, such as by $5^{th}$ generation (5G) or new radio (NR) compliant user equipment.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Some recent UE configurations may be adapted for operation in millimeter wave (mmWave) frequency bands, such as for use in providing high data rate communications. The UEs may, for example, employ RF transceivers containing multiple antenna elements in order to achieve beamforming for accommodating line of sight millimeter wave communication links, minimizing interference, etc. The RF transceivers utilized in such millimeter wave communications typically have relatively high power consumption requirements.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method of embodiments may include monitoring one or more aspects of millimeter wave communication operations associated with a millimeter wave communication link formed using a plurality of active antenna elements of at least one sub-array of a plurality of antenna sub-arrays of a wireless communication device, and determining if a monitored aspect of the one or more aspects of millimeter wave communication operations meets a control criteria. The method of embodiments may further include initiating control to alter at least one of a number of active antenna elements of the plurality of active antenna elements or a particular sub-array of the plurality of antenna sub-arrays used for forming the millimeter wave communication link to provide at least one of thermal, power, or maximum permissible exposure (MPE) mitigation based at least in part upon the one or more aspects of millimeter wave communication operations determined to meet the control criteria.

In an additional aspect of the disclosure, an apparatus for wireless communication is provided. The apparatus of embodiments may include means for monitoring one or more aspects of millimeter wave communication operations associated with a millimeter wave communication link formed using a plurality of active antenna elements of at least one sub-array of a plurality of antenna sub-arrays of a wireless communication device, and means for determining if a monitored aspect of the one or more aspects of millimeter wave communication operations meets a control criteria. The apparatus of embodiments may further include means for initiating control to alter at least one of a number of active antenna elements of the plurality of active antenna elements or a particular sub-array of the plurality of antenna sub-arrays used for forming the millimeter wave communication link to provide at least one of thermal, power, or maximum permissible exposure (MPE) mitigation based at least in part upon the one or more aspects of millimeter wave communication operations determined to meet the control criteria.

In an additional aspect of the disclosure, a non-transitory computer-readable medium having program code recorded thereon for wireless communication is provided. The program code of embodiments may include code to monitor one or more aspects of millimeter wave communication operations associated with a millimeter wave communication link formed using a plurality of active antenna elements of at least one sub-array of a plurality of antenna sub-arrays of a wireless communication device, and code to determine if a monitored aspect of the one or more aspects of millimeter wave communication operations meets a control criteria. The program code of embodiments may further include code to initiate control to alter at least one of a number of active antenna elements of the plurality of active antenna elements or a particular sub-array of the plurality of antenna sub-arrays used for forming the millimeter wave communication link to provide at least one of thermal, power, or maximum permissible exposure (MPE) mitigation based at least in part upon the one or more aspects of millimeter wave communication operations determined to meet the control criteria.

In an additional aspect of the disclosure, an apparatus configured for wireless communication is provided. The apparatus of embodiments includes at least one processor, and a memory coupled to the processor. The processor of embodiments may be configured to to monitor one or more aspects of millimeter wave communication operations associated with a millimeter wave communication link formed using a plurality of active antenna elements of at least one sub-array of a plurality of antenna sub-arrays of a wireless communication device, and to determine if a monitored aspect of the one or more aspects of millimeter wave communication operations meets a control criteria. The processor of embodiments may further be configured to initiate control to alter at least one of a number of active antenna elements of the plurality of active antenna elements or a particular sub-array of the plurality of antenna sub-arrays used for forming the millimeter wave communication link to provide at least one of thermal, power, or maximum permissible exposure (MPE) mitigation based at least in part upon the one or more aspects of millimeter wave communication operations determined to meet the control criteria.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
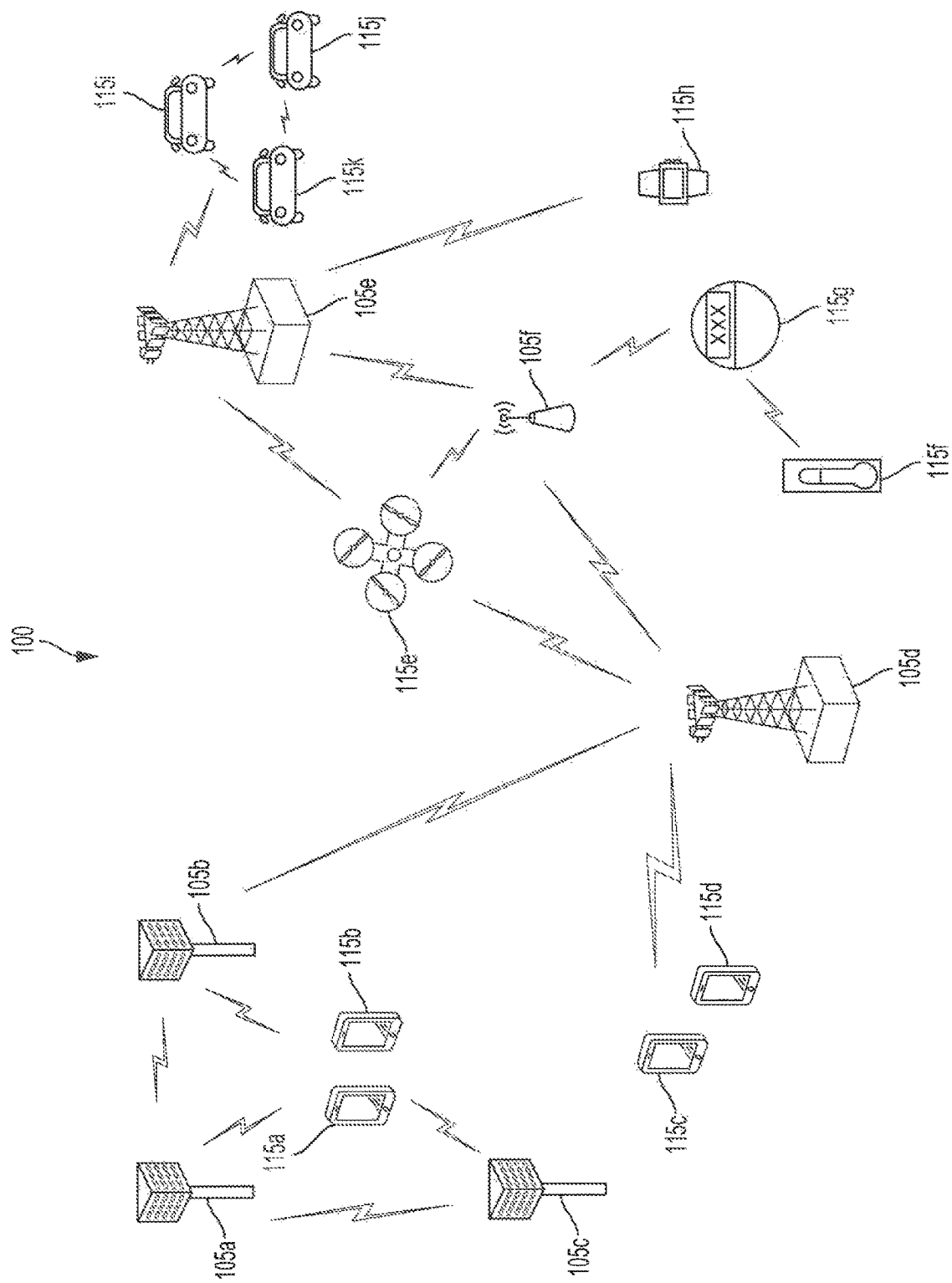
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
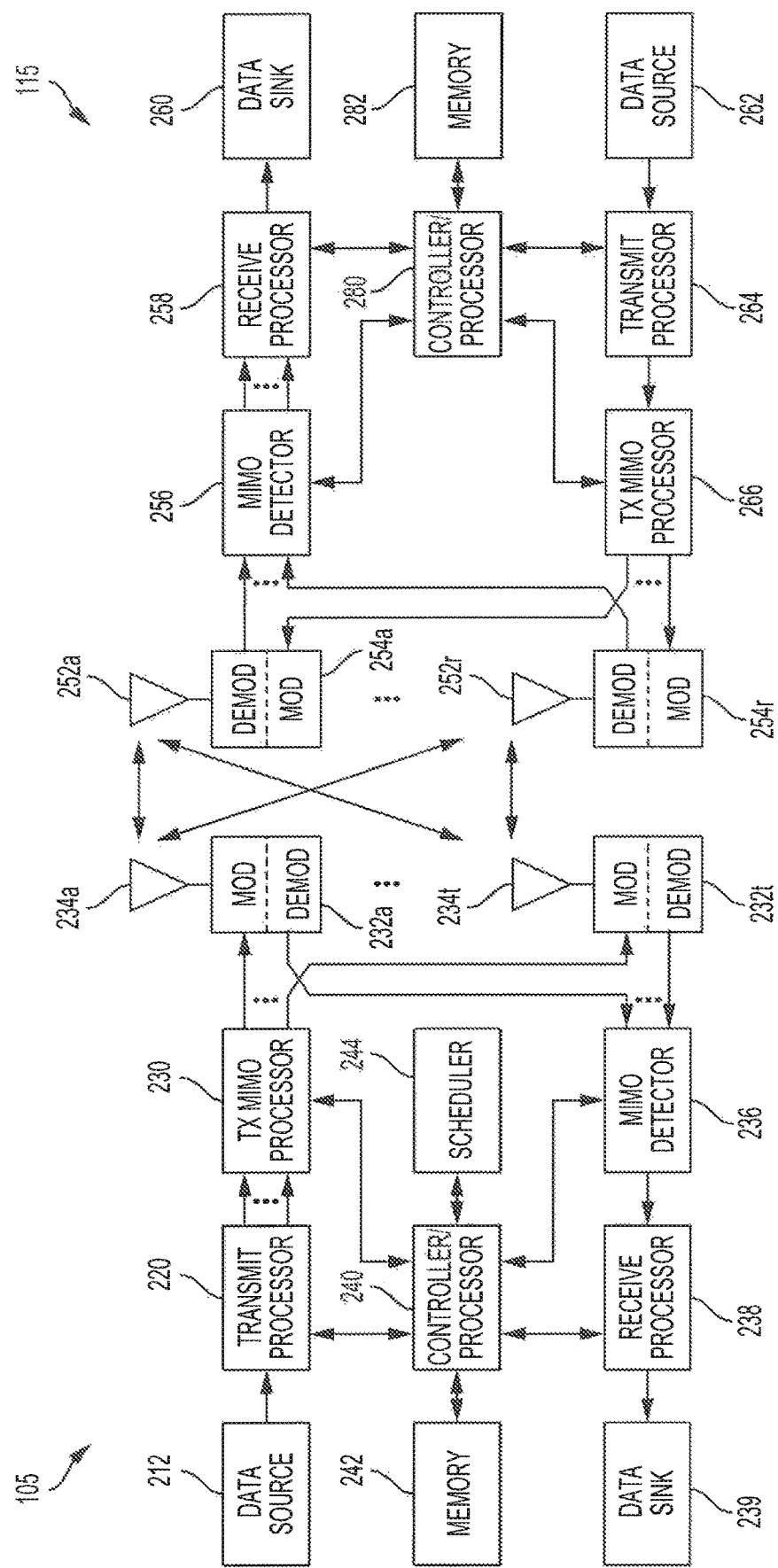
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIG. 4, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Figure 3:
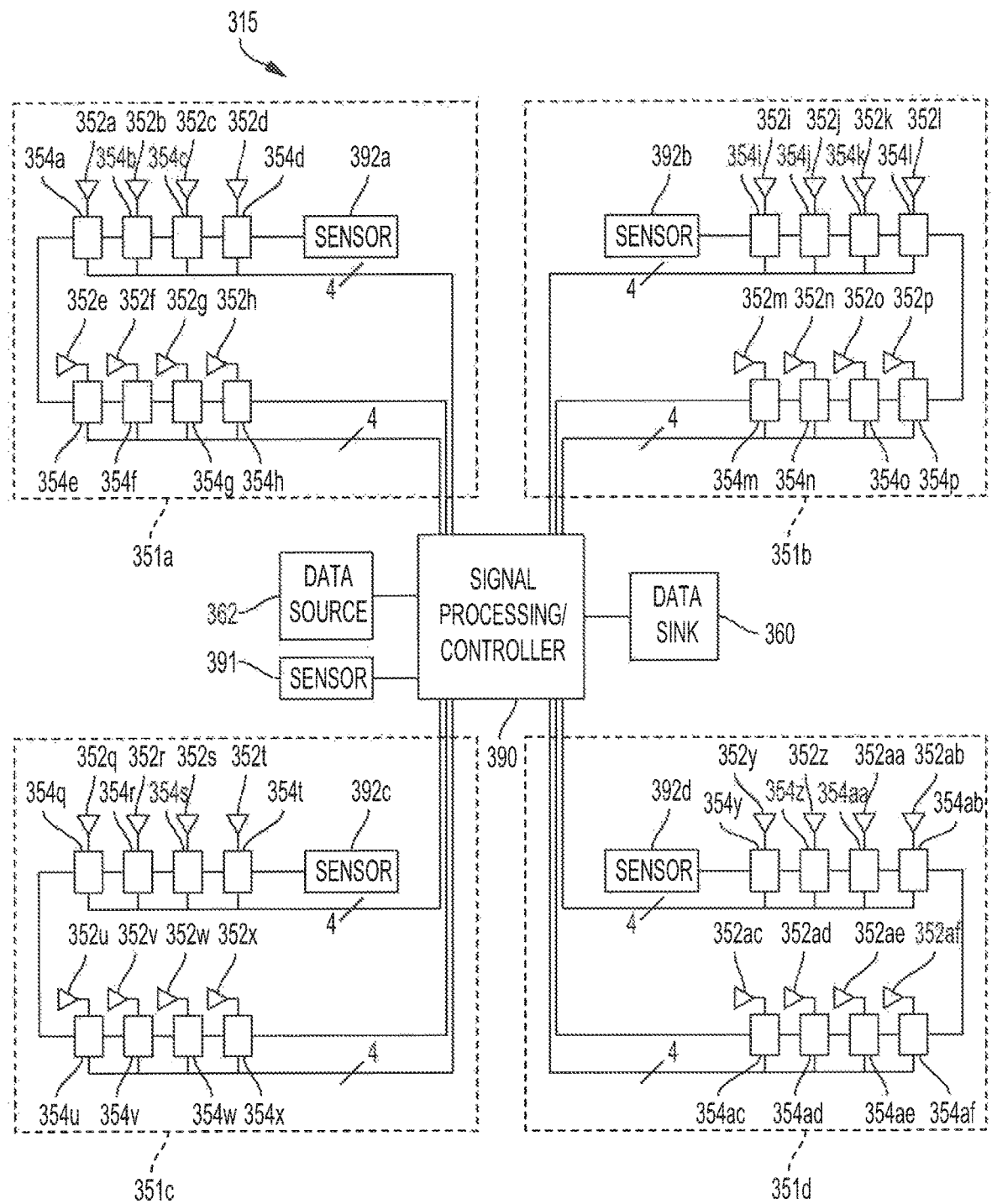
FIG. 3 is a block diagram illustrating details of a UE configured according to some embodiments of the present disclosure.

FIG. 3 shows an embodiment of a UE configured for operation in millimeter wave frequency bands in accordance with concepts of the present disclosure. UE 315, such as may correspond to any of UEs 115 of FIGS. 1 and 2, of the embodiment shown in FIG. 3 implements a transceiver configuration having multiple antenna elements and associated antenna element feed path components to provide beamforming, such as for use in providing high data rate communications in 5G-NR implementations of wireless network 100 (e.g., data communications for receiving data for data sink 360 and/or for transmitting data from data source 362, such as may correspond to data sink 260 and data source 262 of FIG. 2, respectively). In particular, the illustrated embodiment of UE 315 includes antenna modules 351*a*-351*d* for use with respect to millimeter wave communication. Each antenna module includes a plurality of antenna elements and corresponding antenna element feed path components (i.e., antenna module 351*a* includes antenna elements 352*a*-352*h* and their respective antenna element feed path components 354*a*-354*h*, antenna module 351*b* includes antenna elements 352*i*-352*p* and their respective antenna element feed path components 354*i*-354*p*, antenna module 351*c* includes antenna elements 352*q*-352*x* and their respective antenna element feed path components 354*q*-354*x*, and antenna module 351*d* includes antenna elements 352*y*-352*af* and their respective antenna element feed path components 354*v*-354*af*). Each antenna module of the illustrated embodiment provides a multiple sub-array configuration, as described further below.

Antennas elements 352*a*-352*af* may, for example, correspond to respective ones of antennas 252 shown in FIG. 2. Antenna elements 352*a*-352*af* of embodiments may comprise various configurations of resonant antennas (e.g., dipoles, patches, horns, etc.) and may be configured for operation with respect to various polarizations (e.g., horizontal, vertical, slant left, slant right, circular, etc.). Antenna elements of UE 315 shown in the illustrated embodiment include antenna elements provided in sub-arrays configured for orthogonal polarizations. For example, antenna elements 352*a*-352*d*, 352*i*-352*l*, 352*q*-352*t*, and 352*y*-352*ab* have a first polarization (e.g., vertical, slant left, etc.) while antenna elements 352*e*-352*h*, 352*m*-352*p*, 352*u*-352*x*, and 352*ac*-352*af* have a second polarization (e.g., horizontal, slant right, etc.). Such orthogonally polarized antenna elements may, for example, be utilized in implementing MIMO transmission and/or reception (e.g., 2X2 MIMO), as discussed further below.

Antenna element feed path components 354*a*-354*af* may, for example, correspond to respective ones of DEMODs/ MODs 254 shown in FIG. 2. Antenna element feed path components 354*a*-354*af* of embodiments may comprise various RF front end components used with respect to receiving and/or transmitting signals (e.g., filters, amplifiers, downconverters, upconverters, etc.). As will be better understood from the discussion which follows, antenna element feed path components of embodiments are configured for selective control (e.g., enabling, disabling, low power operation, nominal operation, etc.) by signal processing/controller 390 for enabling and providing mitigation of thermal, power consumption, and/or maximum permissible exposure (MPE) issues with respect to millimeter wave communication by UE 315. Accordingly, antenna element feed path components 354*a*-354*af* are shown in FIG. 3 as having a control link coupling one or more components thereof to control logic of signal processing/controller 390.

The antenna elements and antenna element feed path components of each of antenna modules 351*a*-351*d* have signal paths thereof coupled to signal processing/controller 390 of UE 315 for signal processing and control. Accordingly, signal processing/controller 390 may comprise one or more of MIMO detector 256, receive processor 258, transmit processor 264, TX MIMO processor 266, controller/ processor 280, and memory 282, and may be coupled to one or more of data sink 360 for receiving data for transmission and data source 362 for delivering received data. The controller/processor (e.g., controller/processor 280) of signal processing/controller 390 of embodiments is configured with logic for enabling and providing mitigation of thermal, power consumption, and/or MPE issues with respect to millimeter wave communication by UE 315, as will be better understood from the disclosure below. Accordingly, as mentioned above, signal processor/controller 390 of the illustrated embodiment has control links coupled to one or more components of antenna element feed path components 354*a*-354*af*.

Each of antenna modules 351*a*-351*d* may utilize multiple antenna elements and associated antenna element feed path components thereof to provide beamforming with respect to millimeter wave communications. For example, signals provided to (e.g., uplink signals transmitted by UE 315) and/or received from (e.g., downlink signals received by UE 315) antenna elements of an antenna module may be provided phase and weighting control so as to operate the antenna elements in a phased array implementation. Accordingly, antenna modules 351a-351d may each be independently used in providing millimeter wave communication using beamforming. Antenna modules 351a-351d may, for example, each be implemented as millimeter wave radio frequency integrated circuits (RFICs) disposed in a different broadside orientations with respect to UE 315 (e.g., antenna module 351a may have a broadside orientation corresponding to a back surface plane of UE 315, antenna module 351b may have a broadside orientation corresponding to a front surface plane of UE 315, antenna module 351c may have a broadside orientation corresponding to a left surface plane of UE 315, and antenna module 351d may have a broadside orientation corresponding to a right surface plane of UE 315).

In operation according to embodiments, antenna elements 352a-352d may be used to form antenna beams having a first signal polarization and/or antenna elements 352e-352h may be used to form antenna beams having a second signal polarization for illuminating an area corresponding to the orientation of antenna module 351a (e.g., broadside to the UE back surface plane), antenna elements 352i-352l may be used to form antenna beams having a first signal polarization and/or antenna elements 352m-352p may be used to form antenna beams having a second signal polarization for illuminating an area corresponding to the orientation of antenna module 351b (e.g., broadside to the UE front surface plane), antenna elements 352q-352t may be used to form antenna beams having a first signal polarization and/or antenna elements 352u-352x may be used to form antenna beams having a second signal polarization illuminating an area corresponding to the orientation of antenna module 351c (e.g., broadside to the UE left surface plane), and antenna elements 352y-352ab may be used to form antenna beams having a first signal polarization and/or antenna elements 352ac-352af may be used to form antenna beams having a second signal polarization illuminating an area corresponding to the orientation of antenna module 351d (e.g., broadside to the UE right surface plane). For example, a particular one of antenna modules 351a-351d may be utilized for establishing and/or maintaining a millimeter wave link, using beamforming provided by their respective multiple antenna elements and antenna feed path components, with a corresponding base station (e.g., one of base stations 105 of FIGS. 1 and 2, such as a small cell base station configured for millimeter wave communication).

It should be appreciated, however, that RF transceiver configurations enabling such beamforming for millimeter wave communication may experience relatively high power consumption, particularly in light of the multiple antenna element feed paths and their components used for beamforming. Accordingly, such configurations may experience thermal, power consumption, and/or MPE issues. For example, continued operation of the components of a plurality of antenna element feed paths of an antenna module for maintaining a narrow beam millimeter wave communication link may cause heating of the antenna module (particularly in high ambient heat situations) so as to be uncomfortable or unsafe to a user of the UE, to cause thermal related malfunction and even failure of one or more components, etc. Further, operation of the components of a plurality of antenna element feed paths of an antenna module for maintaining a narrow beam millimeter wave communication link utilizes appreciable power, even in situations where bursty data communications have periods of little or no data transmission, where the requisite data rate does not necessitate the robustness of a narrow beam, etc. Establishing and/or maintaining a narrow beam for transmission of millimeter wave signals directed toward (e.g., impinging upon) a user of the UE may present concerns with respect to MPE. Accordingly, embodiments of the present disclosure are configured to manage transceiver antenna element feed path components to mitigate thermal, power consumption, and/or MPE concerns. Embodiments of UE 315 configured in accordance with concepts herein may thus reduce or otherwise control temperatures of various components, device power consumption, and/or user exposure to millimeter wave energy, such as to improve user experience, avoid component failure, extend battery life, etc.

To facilitate the above mentioned operation for enabling and providing mitigation of thermal, power consumption, and/or MPE issues with respect to millimeter wave communication, configurations of UE 315 in accordance with embodiments of the disclosure may comprise one or more sensors (e.g., thermal, proximity, power, and/or orientation sensors). For example, circuitry of signal processing/controller 390 shown in FIG. 3 is coupled to sensor 391 (e.g., comprising a proximity sensor operable to detect the proximity of a user to the UE). Additionally, circuitry of signal processing/controller 390 shown in FIG. 3 is coupled to sensors 392a-392d (e.g., comprising thermal sensors operable to detect the temperature of one or more components of a respective antenna module) of antenna modules 351a-351d.

In operation of embodiments of the present disclosure, when a thermal issue (e.g., undesirably high operating temperature of one or more component), a power consumption issue (e.g., power being undesirably consumed by one or more components not actively engaged in communications), and/or MPE issue (e.g., undesired exposure of a user to signal transmissions), the number of active antenna elements/antenna element feed path components of the UE RF transceiver are reduced and/or the particular antenna elements/antenna element feed path components of the UE RF transceiver used for communication are reselected. Such management of the transceiver components in accordance with concepts herein operates to mitigate the aforementioned thermal, power consumption, and/or MPE issues.

Figure 4:
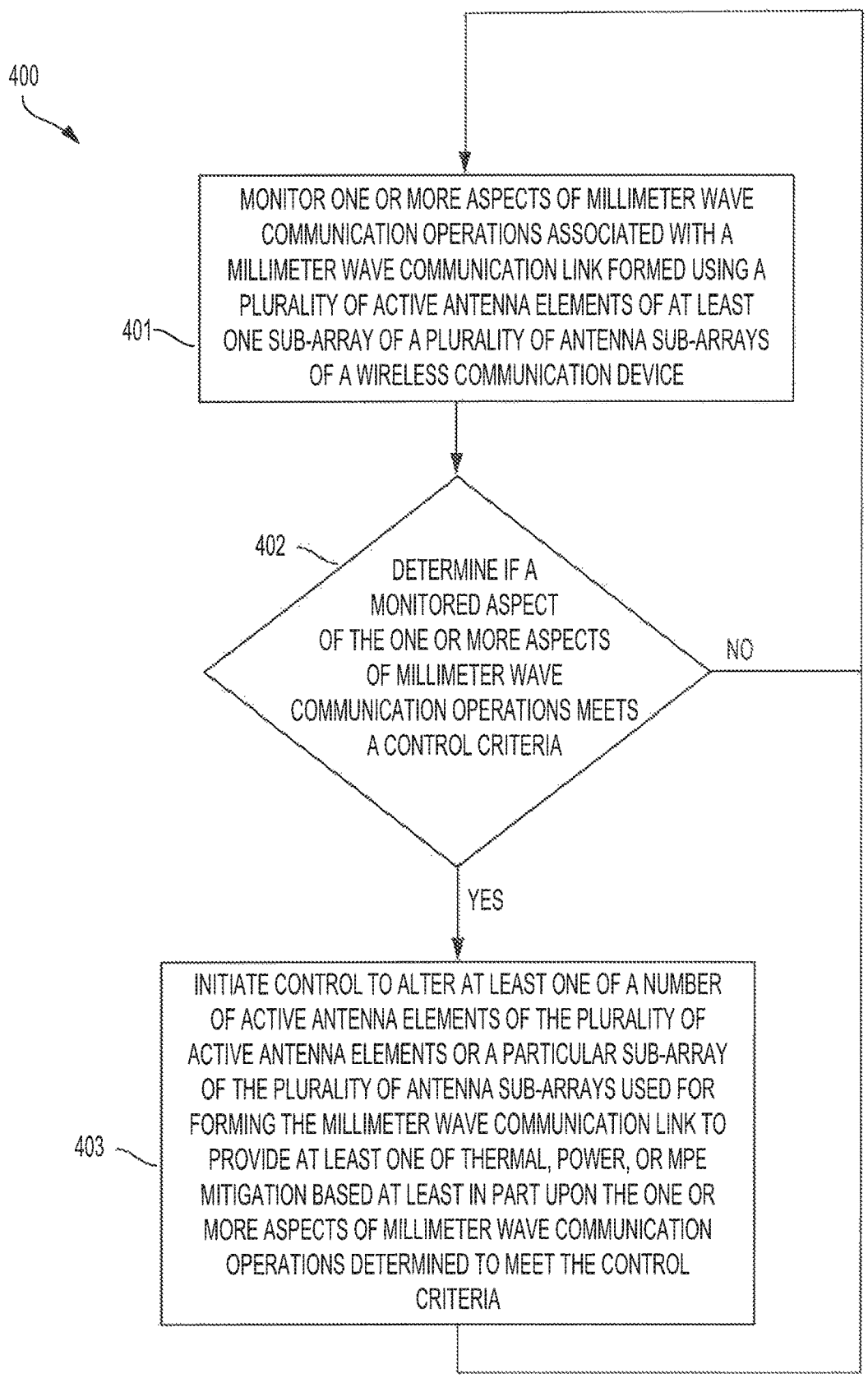
FIG. 4 is a flow diagram illustrating operation to control altering the number and/or particular active antenna elements used for millimeter wave communication according to embodiments of the present disclosure.

FIG. 4 shows a flow diagram providing operation of UE 315 for mitigating thermal, power consumption, and/or MPE issues with respect to millimeter wave communication. In particular, FIG. 4 shows flow 400 comprising various functionality as may be performed by logic (e.g., logic circuits of controller/processor 280 of signal processing/controller 390) of embodiments of UE 315 in controlling one or more components (e.g., components of antenna element feed path components) of antenna modules for millimeter wave communication in accordance with concepts of the present disclosure.

In accordance with flow 400 of the illustrated embodiment, logic of UE 315 monitors one or more aspect of millimeter wave communication operations performed by the UE at block 401. For example, logic circuits of signal processing/controller 390 may monitor any or all of sensors 392a-392d (e.g., comprising a temperature sensor corresponding to an antenna module then in use for millimeter wave communication) for obtaining temperature measurements with respect to one or more components. Additionally or alternatively, logic circuits of signal processing/controller 390 may monitor communication control and operation (e.g., control channel signaling, slot assignments, resource allocation, traffic scheduling, etc.) for obtaining data with respect to power efficiency. Likewise, logic circuits of signal processing/controller 390 may additionally or alternatively monitor sensor 391 (e.g., comprising a proximity and orientation sensor package) for obtaining data with respect to signal impingement on a user.

At block 402 of the illustrated embodiment, logic of UE 315 determines whether a monitored aspect of the millimeter wave communication operations meets a control criteria. For example, logic circuits of signal processing/controller 390 may analyze any or all of the millimeter wave communication operation aspects monitored (e.g., component temperature data, power efficiency data, and/or user/signal impingement data) to determine if one or more control criteria has been met for controlling antenna element feed path components for millimeter wave communication according to embodiments.

Operation according to embodiments may provide for multiple levels of thermal, power consumption, and/or MPE issue mitigation, whereby differing levels of mitigating action are implemented for the respective levels of mitigation alterations to the number of active antenna. Accordingly, the determination made at block 402 of embodiments may not only operate to determine whether a monitored aspect of the millimeter wave communication meets a control criteria, but may further determine a level of a plurality of levels of control criteria that is met.

By way of example, component temperature data may be analyzed to determine if one or more temperature thresholds selected for desired operation (e.g., below a user touch burn or discomfort temperature, below a component malfunction or failure temperature, etc.) has been met or exceeded. As another example, monitored communication control and operation data may be analyzed to determine if desired power efficiencies (e.g., reduction of power consumption during idle or other suitable periods of a communication session) are being realized. As still another example, user/signal impingement data may be analyzed to determine if one or more risk thresholds (e.g., power level threshold for transmitted signal exposure to a user, duration threshold for transmitted signal exposure to a user, etc., selected with respect to acceptable MPE risk) has been met or exceeded. In operation according to the illustrated embodiment, if it is determined that no monitored aspect meets its respective control criteria, processing returns to block 401 to continue monitoring millimeter wave communication operation aspects. If, however, it is determined that a monitored aspect meets its respective control criteria, processing according to the illustrated embodiment proceeds to block 403 to initiate control for mitigating thermal, power consumption, and/or MPE issues with respect to the millimeter wave communication.

Control to alter the number of active antenna elements and/or the particular active antenna elements used for the millimeter wave communication is initiated by logic of UE 315 at block 403. For example, logic circuits of signal processing/controller 390 may control the number of active antenna elements by reducing a number of active antenna elements (e.g., one or more antenna elements used for beamforming, antenna elements of one or more MIMO rank) through disabling (e.g., controlling to enter an off or low power state) components of the respective antenna element feed path components of an antenna module in use for millimeter wave communication. Additionally or alternatively, logic circuits of signal processing/controller 390 may control the particular active antenna elements (e.g., antenna elements of a different antenna module, antenna elements of one or more MIMO ranks, etc.) to change the active antenna elements through disabling and/or enabling components of the respective antenna element feed path components.

The control to alter the number of active antenna elements and/or the particular active antenna elements used for the millimeter wave communication provided at block 403 may implement differing levels of mitigating action for respective levels of control criteria determined to have been met. For example, the levels of control criteria may comprise a base level (e.g., Level 0) at which no mitigation action is taken (e.g., no control criteria has been determined to have been met), a first level (e.g., Level 1) at which at which primary mitigation action is taken (e.g., reducing the active antenna elements, implementing data throttling, etc.), a second level (e.g., Level 2) at which advanced mitigation action is taken (e.g., implementing a change of antenna modules), and a third level (e.g., Level 3) at which terminating mitigation action is taken (e.g., disabling a millimeter wave communication link and initiating fallback to another communication link, such as a LTE wireless link). In operation according to embodiments, various constraints may be implemented with respect to levels of the control criteria levels. For example, a thermal constraint associated with Level 1 of the control criteria for thermal mitigation may set a number of active antenna elements allowed per sub-array of antenna elements of an antenna module (e.g., 4, 2, 1, or 0, wherein a constraint of 2 or 1 active antenna elements may indicate a suitable beam on the then current antenna module is to be formed using the number of antenna elements of the constraint and a constraint of 0 active antenna elements may indicate a different antenna module from which a suitable beam may be formed is to be selected).

As an example of thermal mitigation operation at block 403, logic of UE 315 may reduce a number of active antenna elements (e.g., disable components of the respective antenna element feed path components of an antenna module in use for millimeter wave communication) to initiate component temperature mitigation operation in response to a determination that a first temperature threshold (e.g., a user discomfort temperature threshold) has been met. Continuing with the example of thermal mitigation operation, logic of UE 315 may select particular other antenna elements (e.g., antenna elements of a different antenna module which, although not then active, is nevertheless oriented such that some level of millimeter wave communication may be maintained) and discontinue use of the then active antenna elements to initiate component temperature mitigation operation in response to a determination that a second temperature threshold (e.g., a user burn temperature threshold and/or a component malfunction threshold) has been met. In further operation according to the foregoing example of thermal mitigation operation, logic of UE 315 may reduce the number of then active antenna elements used for millimeter wave communication to zero (i.e., disable the millimeter wave communication link) and fallback to a different wireless communication link to initiate component temperature mitigation operation in response to a determination that a third temperature threshold (a component failure threshold) has been met. It should be appreciated that the wireless communication link to which fallback is implemented according to embodiments may be that of a different radio access technology, use different protocols, etc. For example, the millimeter wave communication link may be provided as part of 5G-NR network operations and fallback may be implanted to a wireless link of LTE network operations, wherein various aspects of the 5G-NR network operations (e.g., NR measurement reports) may correspondingly be halted.

As an example of power consumption mitigation operation at block 403, logic of UE 315 may reduce a number of active antenna elements (e.g., disable components of the respective antenna element feed path components of an antenna module in use for millimeter wave communication) to initiate power consumption mitigation operation in response to a determination that desired power efficiency (e.g., beamforming during idle or other periods of a communication session when robust millimeter wave communication is unnecessary or underutilized) is not being realized. Continuing with the example of power consumption mitigation operation, logic of UE 315 may additionally or alternatively select particular other antenna elements (e.g., orthogonally polarized antenna elements of a MIMO implementation during idle or other periods of a communication session when robust millimeter wave communication is unnecessary or underutilized) for discontinuing use of the selected antenna elements to initiate power consumption mitigation in response to a determination that desired power efficiency (e.g., MIMO operation during idle or other periods of a communication session when robust millimeter wave communication is unnecessary or underutilized) is not being realized.

As an example of MPE mitigation operation at block 403, logic of UE 315 may reduce a number of active antenna elements (e.g., disable components of the respective antenna element feed path components of an antenna module in use for millimeter wave communication) to initiate MPE risk mitigation operation in response to a determination that a first MPE risk threshold (e.g., a power level threshold for transmitted signal exposure to a user) has been met. Continuing with the example of MPE mitigation operation, logic of UE 315 may select particular other antenna elements (e.g., antenna elements of a different antenna module which, although not then active, is nevertheless oriented such that some level of millimeter wave communication may be maintained while impingement of the transmitted signal on the user is avoided or reduced) and discontinuing use of the then active antenna elements to initiate MPE risk mitigation operation in response to a determination that a second MPE risk threshold (e.g., a duration threshold for transmitted signal exposure to a user) has been met.

Having generally described operation according to embodiments of UE 315 operating in accordance with flow 400 above, further detail with respect to exemplary operation is provided below to further aid in the understanding of concepts of the present disclosure. It should be appreciated that the examples given are non-limiting with respect to application of the concepts herein and thus the skilled artisan will readily understand that embodiments deviating from the particulars of such examples fall within the spirit and scope of the present disclosure.

In operation of embodiments herein with respect to end-user applications with a bursty traffic pattern, such as video streaming or video conference calling, RF power is saved during periods of data inactivity (e.g., as may be determined by monitoring communication control and operation) by reducing the number of active antenna elements. For example, a narrow beam providing a relatively strong millimeter wave signal and/or MIMO operation providing robust millimeter wave communication may not be necessary for maintaining a communication link during periods of data inactivity. Accordingly, embodiments may reduce the number of active antenna elements (e.g., reducing a number of antenna elements used in beamforming and/or reducing a MIMO rank, such as to provide single input single output (SISO) operation, in operation according to flow 400 above), wherein good control channel performance is nevertheless maintained with the reduced set of active antenna elements.

Figure 5A:
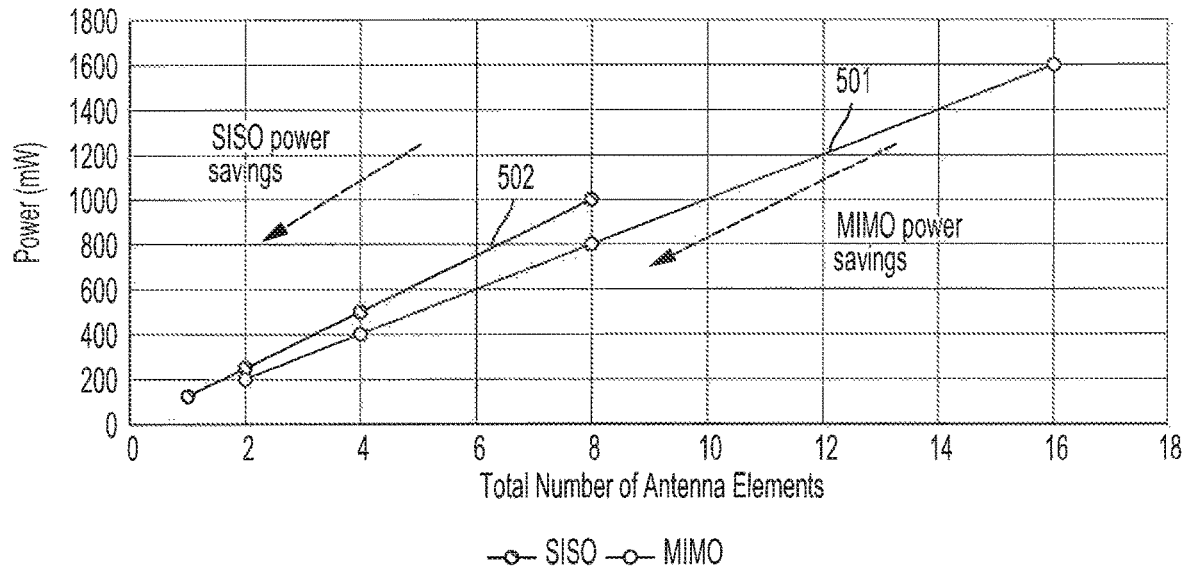
FIGS. 5A and 5B are graphs illustrating power consumption for SISO and MIMO antenna configurations according to embodiments of the present disclosure.
Figure 5B:
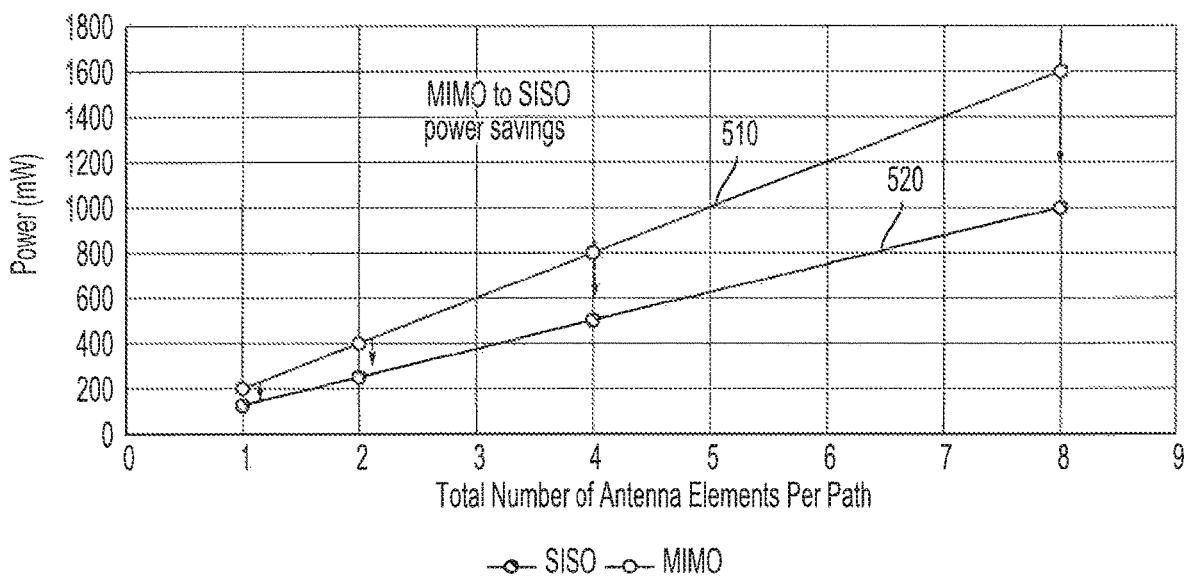

Power consumption savings as may be realized in accordance with the above examples may be better appreciated from the graphs illustrated in FIGS. 5A and 5B illustrating power consumption for SISO and MIMO antenna configurations. The table below provides an example antenna module configuration (e.g., as may correspond to an embodiment of any of antenna modules 351a-351d) corresponding to the SISO and MIMO antenna configurations of FIGS. 5A and 5B. The antenna module configuration of the table below provides for 1X1 SISO mode and 2X2 MIMO mode communication using 8 antenna elements having a first polarization (e.g., horizontal) and 8 antenna elements having a second polarization (e.g., vertical). As shown by graph 501 of FIG. 5A, a UE operating in 2X2 MIMO mode (e.g., using two antenna polarizations, wherein each polarization has a same number of active antenna elements as shown in the table below) can reduce the number of active antenna elements and maintain 2X2 MIMO operation with reduced power consumption. As shown by graph 502 of FIG. 5A, a UE operating in 1X1 SISO mode (e.g., using a single antenna polarization) can reduce the number of active antenna elements and maintain 1X1 SISO operation with reduced power consumption. A UE operating in 2X2 MIMO mode can reduce the number of active antenna elements by switching from 2X2 MIMO to 1X1 SISO mode operation with reduced power consumption, as shown by graphs 510 and 520 of FIG. 5B.

| | 1 × 1 SISO Mode | | | 2 × 2 MIMO Mode | |
|---|---|---|---|---|---|
| H Elements | V Elements | Total Elements (H + V) | H Elements | V Elements | Total Elements (H + V) |
| 1 | 0 | 1 | 1 | 1 | 2 |
| 2 | 0 | 2 | 2 | 2 | 4 |
| 4 | 0 | 4 | 4 | 4 | 8 |
| 8 | 0 | 8 | 8 | 8 | 16 |

In high data rate uplink or downlink use situations (e.g., as may be determined by monitoring communication control and operation and/or component temperature data), generation of heat is reduced according to embodiments by reducing the number of active antenna elements. For example, a narrow beam providing a relatively strong millimeter wave signal and/or MIMO operation providing robust millimeter wave communication may not be necessary for maintaining some level of millimeter wave data communication. Accordingly, embodiments may reduce the number of active antenna elements (e.g., reducing a number of antenna elements used in beamforming and/or reducing a MIMO rank, such as to provide SISO operation, in operation according to flow 400 above) to reduce power consumption and facilitate mitigation of heat generation, wherein a reduced data rate (e.g., data throttling) may be maintained in the uplink and/or downlink with the reduced set of active antenna elements. It should be appreciated that such operation to reduce the active antenna elements may be accompanied by coordination between the UE and base station (e.g., the UE reporting to the base station that MIMO operation is being discontinued by the UE in favor of SISO operation, to thereby initiate a corresponding reduction in rank of the transmission to the UE by the base station).

Operation to mitigate power consumption and/or thermal issues according to embodiments may be controlled based upon monitoring various aspects of millimeter wave communication control and operation. For example, a UE operating in accordance with flow 400 above can monitor control channel signaling, slot assignments, resource allocation, traffic scheduling, etc. to determine uplink and downlink utilization for controlling antenna element feed path components in accordance with concepts of the present disclosure. As a specific example of the foregoing, logic of UE 315 may monitor the slot assignment pattern to determine the relative number of downlink symbols compared to uplink symbols (e.g., averaged over a period of time, a number of symbols, a number of frames, etc.). In operation according to embodiments, if the slot assignment (e.g., number of downlink symbols compared to the number of uplink symbols) indicates a traffic pattern of mostly downlink symbols, then the UE can reduce the antenna elements in accordance with flow 400 on only downlink symbols. However, if the slot assignment (e.g., number of downlink symbols compared to the number of uplink symbols) indicates a traffic pattern of mostly uplink symbols, then the UE can reduce the antenna elements in accordance with flow 400 on only uplink symbols.

Figure 6A:
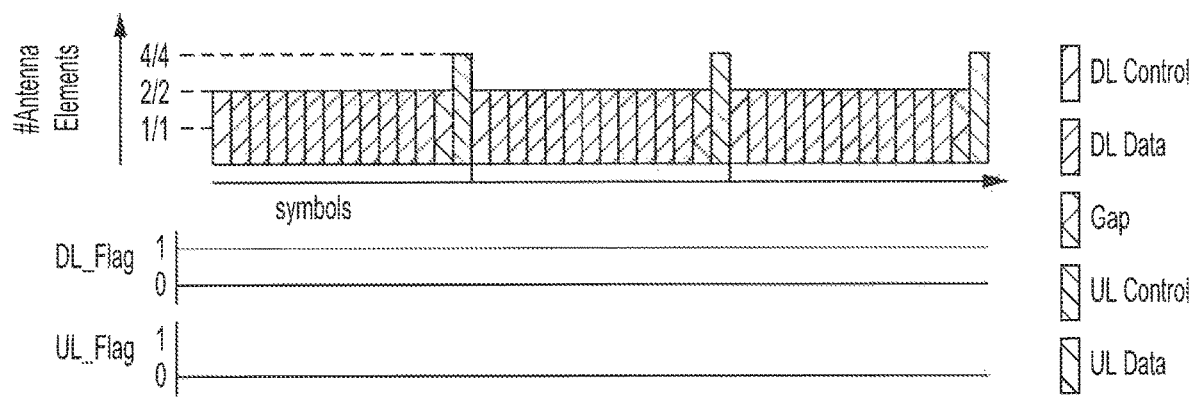
FIGS. 6A and 6B are block diagrams illustrating operation to reduce the number of antenna elements only with respect to downlink or uplink symbols according to embodiments of the present disclosure.
Figure 6B:
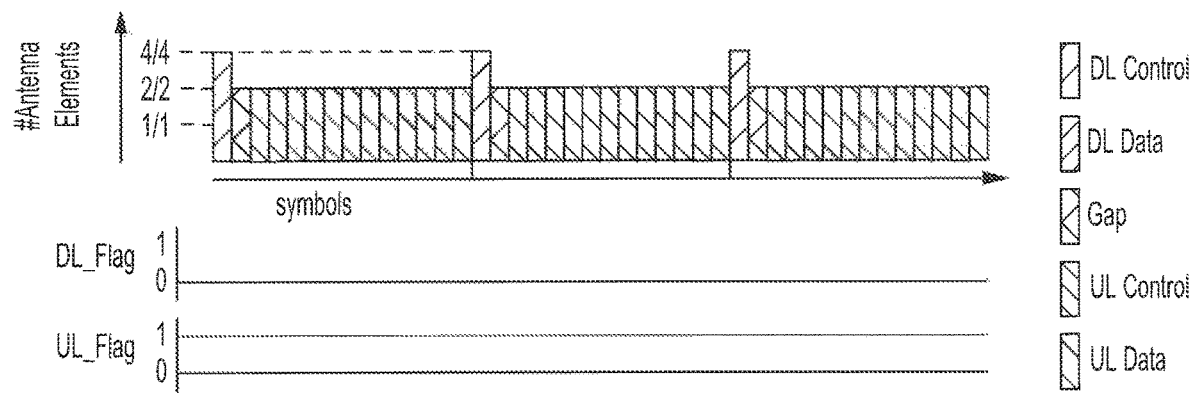

FIGS. 6A and 6B illustrate operation to reduce the number of antenna elements only with respect to downlink symbols (FIG. 6A) and only with respect to uplink symbols (FIG. 6B) based upon detecting if the UE is in downlink or uplink dominant use case. In operation according to the examples of FIGS. 6A and 6B, downlink and uplink dominance flags (shown as DL_Flag and UL_Flag respectively) are determined by analyzing the downlink and uplink scheduling rate. For example, a predetermined number of assigned symbols (e.g., 1,000, 10,000, etc.) or the downlink symbols and uplink symbols of a predetermined number of slots (e.g. 100, 1,000, etc.) may be averaged for generating downlink and uplink dominance flags based upon a comparison of the averaged downlink symbols assigned to the averaged uplink symbols assigned. The downlink and uplink dominance flags may be generated according to embodiments by computing a fraction from the average number of downlink symbols divided by the average number of uplink symbols to give a result between 0 and 1, wherein results more near 1 (e.g., $DL_{symb}/UL_{symb} \geq 0.75$) may generate DL_Flag=1 and UL_Flag=0 and results more near 0 (e.g., $DL_{symb}/UL_{symb} \leq 0.25$) may generate DL_Flag=0 and UL_Flag=1 (results in some middle range, such as $0.25 < DL_{symb}/UL_{symb} < 0.75$ may generate DL_Flag=0 and UL_Flag=0 to avoid implementing control to alter the number and/or particular active antenna elements based upon slot assignments). The downlink and uplink dominance flags may be regenerated periodically, such as every slot (e.g., having periodicity of 1 ms, 500 µs, 250 µs, or 125 µs) or some other suitable period. In the example of FIG. 6A, the downlink dominance flag is set high and the uplink dominance flag is set low, indicating that downlink symbol transmission dominates the millimeter wave communication, and thus the antenna element feed path components contribute more significantly to power consumption and/or heat generation in association with downlink communication. Accordingly, the number of active antenna elements (e.g., 2 horizontal and 2 vertical) is reduced for the downlink symbols (e.g., downlink control and downlink data symbols) with respect to the number of active antenna elements (e.g., 4 horizontal and 4 vertical) used for the uplink symbols (e.g., uplink control symbols). In this example, where there is frequent downlink data, the receive beam may be altered, although some level of millimeter wave data reception remains supported, and the transmission beam remains unchanged. In the example of FIG. 6B, the downlink dominance flag is set low and the uplink dominance flag is set high, indicating that uplink symbol transmission dominates the millimeter wave communication, and thus the antenna element feed path components contribute more significantly to power consumption and/or heat generation in association with uplink communication. Accordingly, the number of active antenna elements (e.g., 2 horizontal and 2 vertical) is reduced for the uplink symbols (e.g., uplink control and uplink data symbols) with respect to the number of active antenna elements (e.g., 4 horizontal and 4 vertical) used for the downlink symbols (e.g., downlink control symbols). In this example, where transmit power is high with frequent uplink data, the transmit beam may be altered, although some level of millimeter wave data transmission remains supported, and the receive beam remains unchanged.

In high data rate uplink use cases requiring relatively high transmit power where the transmit signal significantly impinges on a user (e.g., as may be determined by monitoring communication control and operation and proximity sensor data), embodiments herein reduce the number of active antenna elements and/or select different antenna elements to reduce the signal impinging on the user. For example, reducing the number of active antenna elements (e.g., reducing a number of antenna elements used in beamforming and/or reducing a MIMO rank, such as to provide SISO operation, in operation according to flow 400 above) results in power reduction for mitigating MPE according to embodiments. Selecting different antenna elements (e.g., de-selecting currently active antenna elements of a first antenna module and instead selecting antenna elements of a second antenna module oriented to maintain some level of millimeter wave communication according to flow 400 above) results in reduced impingement of the transmitted signal on the user for mitigating MPE according to embodiments.

In operation according to embodiments, where the active antenna elements are reduced to the lowest number configuration and undesired operational aspects are monitored (e.g., thermal, power efficiency, and/or MPE issues are monitored), then the UE may switch operation from the current antenna module to another antenna module. For example, logic of UE 315 may, either iteratively or in a single pass, decrease the number of active antenna elements to a lowest active antenna element configuration (e.g., 1 horizontal/1 vertical for MIMO or 1 horizontal/0 vertical for SISO) in operation according to an embodiment of flow 400 determining that one or more monitored aspect meets control criteria. Thereafter, if operation according to flow 400 continues to indicate that one or more monitored aspect meets control criteria (e.g., antenna element feed path components continue to meet or exceed a thermal or power efficiency threshold), logic of UE 315 may initiate a switch from the antenna elements of one of antenna modules 351a-351d to antenna elements of a different one of antenna modules 351a-351d for millimeter wave communication. In operation according to embodiments, millimeter wave communication may be initiated using a number of active antenna elements greater than the lowest active antenna element configuration.

It can be appreciated from the foregoing that embodiments configured in accordance with concepts of the present disclosure reduce or otherwise control temperatures of various components, device power consumption, and/or user exposure to millimeter wave energy. In a situation where a device operable with respect to millimeter wave communication is operated in high ambient temperature, a data call using a millimeter wave communication link can be sustained for a longer duration by employing techniques described herein. Additionally or alternatively, power consumption by a device operable with respect to millimeter wave communication (e.g., in low data rate and/or bursty data pattern situations) can be optimized (e.g., increasing battery life) by reducing the active antenna elements in accordance with techniques described herein. such as to improve user experience, avoid component failure, extend battery life, etc.

Although various exemplary embodiments have been described above to aid in understanding the concepts of the present disclosure, it should be appreciated that the examples are non-limiting with respect to implementations employing techniques described herein. For example, although UE 315 illustrated in FIG. 3 is shown as having 4 antenna modules, each having 4 horizontal and 4 vertical polarized antenna elements, embodiments herein may implement a different configuration. For example, a different number of antenna modules (e.g., 1, 2, 3, 5, 6, etc.) may be provided with respect to a particular device implementation. Similarly, a different antenna element polarization configurations (e.g., more or less than the 2 polarizations shown, additional or alternative polarizations to the horizontal and vertical polarizations shown, etc., perhaps facilitating greater MIMO ranks than the exemplary 2X2 MIMO), may be provided with respect to a particular device implementation. Likewise, different numbers of antenna elements to those shown in FIG. 3 and the table above may be provided with respect to a particular device implementation.

It should be appreciated that, although embodiments have been described above with reference to logic of a UE determining to control altering a number and/or particular active antenna elements used for millimeter wave communication operations (e.g., logic of UE 315 implementing the operations of flow 400), embodiments may nevertheless implement such functionality in alternative configurations. For example, a UE may monitor aspects of millimeter wave communication and report that information to a base station or other network device for determinations regarding controlling altering a number and/or particular active antenna elements used for millimeter wave communication operations. The base station or other network device may then provide a control signal to the UE for initiating the control to alter the number and/or particular antenna elements.

Although embodiments have been described herein with reference to performing operation to alter the number and/or particular active antenna elements of a UE, it should be appreciated that concepts herein may be applied to other devices (e.g., base stations and other network devices) operable with respect to millimeter wave communication. For example, operations in accordance with flow 400 may be implemented by logic of a base station (e.g., logic circuits of controller/processor 220 of base station 105 shown in FIG. 2) to reduce or otherwise control temperatures of various components, device power consumption, and/or user exposure to millimeter wave energy.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIG. 4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   monitoring a temperature corresponding to a first antenna array in use for millimeter wave communication operations for a millimeter wave communication link with a remote station formed using a number of a plurality of active antenna elements of at least one sub-array of the first antenna array;
   determining that a monitored temperature meets a first temperature threshold of a plurality of temperature thresholds selected for indicating is different millimeter wave communication operation issues with respect to an antenna feed path component associated with the first antenna array, wherein a plurality of thermal mitigation levels are defined for providing different component temperature mitigation operation for respective millimeter wave communication operation issues of the different millimeter wave communication operation issues, the first temperature threshold being for a first thermal mitigation level of the plurality of thermal mitigation levels providing first component temperature mitigation operation comprising alteration of the number of active antenna elements of the plurality of active antenna elements used for forming the millimeter wave communication link and a second temperature threshold being for a second thermal mitigation level of the plurality of thermal mitigation levels providing second component temperature mitigation operation comprising changing from the first antenna array to a different antenna array; and
   initiating the first component temperature mitigation operation to alter the number of the plurality of active antenna elements of the at least one sub-array for forming the millimeter wave communication link and facilitate thermal mitigation for the antenna feed path component based upon the monitored temperature determined to meet the first temperature threshold.

2. The method of claim 1, wherein the first component temperature mitigation operation to alter the number of the plurality of active antenna elements reduces
   a number of active antenna elements of multiple sub-arrays of a plurality of antenna sub-arrays of a multiple input, multiple output (MIMO) mode communication used for forming the millimeter wave communication link to maintain MIMO operation.

3. The method of claim 1, wherein the first component temperature mitigation operation to alter the number of the plurality of active antenna elements reduces
   a number of active antenna elements of a sub-array of a plurality of antenna sub-arrays of a single input, single output (SISO) mode communication used for forming the millimeter wave communication link to maintain SISO operation.

4. The method of claim 1, wherein the first component temperature mitigation operation to alter the number of the plurality of active antenna elements reduces
   a rank of multiple input, multiple output (MIMO) used for forming the millimeter wave communication link by reducing a number of sub-arrays of a plurality of antenna sub-arrays with active antenna elements used for forming the millimeter wave communication link.

5. The method of claim 1, further comprising:
   reducing the number of the plurality of active antenna elements in accordance with a thermal constraint associated with the first thermal mitigation level, wherein the thermal constraint sets a number of active antenna elements allowed per sub-array of antenna elements of the first antenna array for the first component temperature mitigation operation.

6. The method of claim 1, wherein the first temperature threshold corresponds to a user touch temperature of the different millimeter wave communication operation issues and a second temperature threshold corresponds to a component malfunction temperature of the different millimeter wave communication operation issues.

7. The method of claim 1, wherein the plurality of thermal mitigation levels include a third temperature threshold for a third thermal mitigation level providing third component temperature mitigation operation comprising falling back from the millimeter wave communication link to an alternative wireless link.

8. An apparatus of wireless communication, comprising:
   means for monitoring a temperature corresponding to a first antenna array in use for millimeter wave communication operations for a millimeter wave communication link with a remote station formed using a number of a plurality of active antenna elements of at least one sub-array of the first antenna array;

means for determining that a monitored temperature meets a first temperature threshold of a plurality of temperature thresholds selected for indicating different millimeter wave communication operation issues with respect to an antenna feed path component associated with the first antenna array, wherein a plurality of thermal mitigation levels are defined for providing different component temperature mitigation operation for respective millimeter wave communication operation issues of the different millimeter wave communication operation issues, the first temperature threshold being for a first thermal mitigation level of the plurality of thermal mitigation levels providing first component temperature mitigation operation comprising alteration of the number of active antenna elements of the plurality of active antenna elements used for forming the millimeter wave communication link and a second temperature threshold being for a second thermal mitigation level of the plurality of thermal mitigation levels providing second component temperature mitigation operation comprising changing from the first antenna array to a different antenna array; and means for initiating the first component temperature mitigation operation to alter the number of the plurality of active antenna elements of the at least one sub-array for forming the millimeter wave communication link and facilitate thermal mitigation for the antenna feed path component based upon the monitored temperature determined to meet the first temperature threshold.

9. The apparatus of claim 8, wherein the first component temperature mitigation operation to alter the number of the plurality of active antenna elements reduces a number of active antenna elements of multiple sub-arrays of a plurality of antenna sub-arrays of a multiple input, multiple output (MIMO) mode communication used for forming the millimeter wave communication link to maintain MIMO operation.

10. The apparatus of claim 8, wherein the first component temperature mitigation operation to alter the number of the plurality of active antenna elements reduces a number of active antenna elements of a sub-array of a plurality of antenna sub-arrays of a single input, single output (SISO) mode communication used for forming the millimeter wave communication link to maintain SISO operation.

11. The apparatus of claim 8, wherein the first component temperature mitigation operation to alter the number of the plurality of active antenna elements reduces a rank of multiple input, multiple output (MIMO) used for forming the millimeter wave communication link by reducing a number of sub-arrays of a plurality of antenna sub-arrays with active antenna elements used for forming the millimeter wave communication link.

12. The apparatus of claim 8, further comprising:

means for reducing the number of the plurality of active antenna elements in accordance with a thermal constraint associated with the first thermal mitigation level, wherein the thermal constraint sets a number of active antenna elements allowed per sub-array of antenna elements of the first antenna array for the first component temperature mitigation operation.

13. The apparatus of claim 8, wherein the first temperature threshold corresponds to a user touch temperature of the different millimeter wave communication operation issues and a second temperature threshold corresponds to a component malfunction temperature of the different millimeter wave communication operation issues.

14. The apparatus of claim 8, wherein the plurality of thermal mitigation levels include a third temperature threshold for a third thermal mitigation level providing third component temperature mitigation operation comprising falling back from the millimeter wave communication link to an alternative wireless link.

15. A non-transitory computer-readable medium having program code for wireless communication recorded thereon, the program code comprising:

program code executable by a processor for causing execution to:

monitor a temperature corresponding to a first antenna array is use for millimeter wave communication operations for a millimeter wave communication link with a remote station formed using a number of a plurality of active antenna elements of at least one sub-array of the first antenna array;

determine that a monitored temperature meets a first temperature threshold of a plurality of temperature thresholds selected for indicating different millimeter wave communication operation issues with respect to antenna feed path component associated with the first antenna array, wherein a plurality of thermal mitigation levels are defined for providing different component temperature mitigation operation for respective millimeter wave communication operation issues of the different millimeter wave communication operation issues, the first temperature threshold being for a first thermal mitigation level of the plurality of thermal mitigation levels providing first component temperature mitigation operation comprising alteration of the number of active antenna elements of the plurality of active antenna elements used for forming the millimeter wave communication link and a second temperature threshold being for a second thermal mitigation level of the plurality of thermal mitigation levels providing second component temperature mitigation operation comprising changing from the first antenna array to a different antenna array; and initiate the first component temperature mitigation operation to alter the number of the plurality of active antenna elements of the at least one sub-array for forming the millimeter wave communication link and facilitate thermal mitigation for the antenna feed path component upon the monitored temperature determined to meet the first temperature threshold.

16. The non-transitory computer-readable medium of claim 15, wherein the first component temperature mitigation operation to alter the number of the plurality of active antenna elements reduces a number of active antenna elements of multiple sub-arrays of a plurality of antenna sub-arrays of a multiple input, multiple output (MIMO) mode communication used for forming the millimeter wave communication link to maintain MIMO operation.

17. The non-transitory computer-readable medium of claim 15, wherein the first component temperature mitigation operation to alter the number of the plurality of active antenna elements reduces a number of active antenna elements of a sub-array of a plurality of antenna sub-arrays of a single input, single output (SISO) mode communication used for forming the millimeter wave communication link to maintain SISO operation with.

18. The non-transitory computer-readable medium of claim 15, wherein the first component temperature mitigation operation to alter the number of the plurality of active antenna elements reduces
a rank of multiple input, multiple output (MIMO) used for forming the millimeter wave communication link by reducing a number of sub-arrays of a plurality of antenna sub-arrays with active antenna elements used for forming the millimeter wave communication link.

19. The non-transitory computer-readable medium of claim 15, further comprising program, code executable by the processor for causing execution to:
reduce the number of the plurality of active antenna elements in accordance with a thermal constraint associated with the first thermal mitigation level, wherein the thermal constraint sets a number of active antenna elements allowed per sub-array of antenna elements of the first antenna array for the first component temperature mitigation operation.

20. The non-transitory computer-readable medium of claim 15, the first temperature threshold corresponds to a user touch temperature of the different millimeter wave communication operation issues.

21. The non-transitory computer-readable medium of claim 15, wherein the plurality of thermal mitigation levels include a third temperature threshold for a third thermal mitigation level providing third component temperature mitigation operation comprising falling back from the millimeter wave communication link to an alternative wireless link.

22. An apparatus configured for wireless communication, the apparatus comprising:
a processing system that includes at least one processor and
a memory coupled to the at least one processor, wherein the processing system is configured to cause the apparatus:
to monitor a temperature corresponding to a first antenna array in use for millimeter wave communication operations for a millimeter wave communication link with a remote station formed using a number of a plurality of active antenna elements of at least one sub-array of the first antenna array;
to determine that a monitored temperature meets a first temperature threshold of a plurality of temperature thresholds selected for indicating different millimeter wave communication operation issues with respect to an antenna feed path component associated with the first antenna array, wherein a plurality of thermal mitigation levels are defined for providing different component temperature mitigation operation for respective millimeter wave communication operation issues of the different millimeter wave communication operation issues, the first temperature threshold being for a first thermal mitigation level of the plurality of thermal mitigation levels providing first component temperature mitigation operation comprising alteration of the number of active antenna elements of the plurality of active antenna elements used for forming the millimeter wave communication link and a second temperature threshold being for a second thermal mitigation level of the plurality of thermal mitigation levels providing second component temperature mitigation operation comprising changing from the first antenna array to a different antenna array; and
to initiate the first component temperature mitigation operation to alter the number of the plurality of active antenna elements of the at least one sub-array for forming the millimeter wave communication link and facilitate thermal mitigation for the antenna feed path component based upon the monitored temperature determined to meet the first temperature threshold.

23. The apparatus of claim 22, wherein the first component temperature mitigation operation to alter the number of the plurality of active antenna elements reduces
a number of active antenna elements of multiple sub-arrays of a plurality of antenna sub-arrays of a multiple input, multiple output (MIMO) mode communication used for forming the millimeter wave communication link to maintain MIMO operation.

24. The apparatus of claim 22, wherein the first component temperature mitigation operation to alter the number of the plurality of active antenna elements reduces
a number of active antenna elements of a sub-array of a plurality of antenna sub-arrays of a single input, single output (SISO) mode communication used for forming the millimeter wave communication link to maintain SISO operation.

25. The apparatus of claim 22, wherein the first component temperature mitigation operation to alter the number of the plurality of active antenna elements reduces
a rank of multiple input, multiple output (MIMO) used for forming the millimeter wave communication link by reducing a number of sub-arrays of a plurality of antenna sub-arrays with active antenna elements used for forming the millimeter wave communication link.

26. The apparatus of claim 22, wherein the processing system is further configured to cause the apparatus:
to reduce the number of the plurality of active antenna elements in accordance with a thermal constraint associated with the first thermal mitigation level, wherein the thermal constraint sets a number of active antenna elements allowed per sub-array of antenna elements of the first antenna array for the first component temperature mitigation operation.

27. The apparatus of claim 7, wherein the first temperature threshold corresponds to a user touch temperature of the different millimeter wave communication operation issues.

28. The apparatus of claim 23, wherein the plurality of thermal mitigation levels include a third temperature threshold for a third thermal mitigation level providing third component temperature mitigation operation comprising falling back from the millimeter wave communication link to an alternative wireless link.

* * * * *